United States Patent [19]

Tellerman

[11] Patent Number: 5,334,933
[45] Date of Patent: Aug. 2, 1994

[54] VARIABLE REJECTION METHOD FOR IMPROVED SIGNAL DISCRIMINATION IN A MAGNETOSTRICTIVE POSITION TRANSDUCER

[75] Inventor: Jacob Tellerman, Bayside, N.Y.

[73] Assignee: MTS Systems Corporation, Eden Prairie, Minn.

[21] Appl. No.: 156,678

[22] Filed: Nov. 22, 1993

Related U.S. Application Data

[63] Continuation of Ser. No. 756,978, Sep. 9, 1991, abandoned.

[51] Int. Cl.⁵ .................. G01B 7/14; G01F 23/46; H04B 11/00
[52] U.S. Cl. .................. 324/207.13; 73/314; 324/207.12
[58] Field of Search ............ 324/207.12, 207.13, 324/207.22, 207.24, 533; 73/314; 333/148; 367/98, 900

[56] References Cited

U.S. PATENT DOCUMENTS

| | | | |
|---|---|---|---|
| 2,800,627 | 7/1957 | Oudin et al. | 324/533 |
| 3,244,975 | 4/1966 | Bauer | 324/533 |
| 3,517,306 | 6/1970 | Anderson et al. | 324/533 |
| 3,898,555 | 8/1975 | Tellerman | 324/207.13 |
| 4,144,519 | 3/1979 | Chamuel | |
| 4,315,325 | 2/1982 | Blades | |
| 4,404,523 | 9/1983 | Hughes et al. | 324/207.13 |
| 4,721,902 | 1/1988 | Tellerman et al. | 324/617 X |
| 4,765,186 | 8/1988 | Dieulesaint et al. | |
| 4,939,457 | 7/1990 | Tellerman | 324/207.13 |
| 4,943,773 | 7/1990 | Koski et al. | 324/207.13 |

FOREIGN PATENT DOCUMENTS

| | | | |
|---|---|---|---|
| 0204184 | 12/1986 | European Pat. Off. | |
| 0115151 | 9/1979 | Japan | 324/207.13 |
| 0115153 | 9/1979 | Japan | 324/207.13 |

*Primary Examiner*—Gerard R. Strecker
*Attorney, Agent, or Firm*—Merchant, Gould, Smith, Edell, Welter & Schmidt

[57] ABSTRACT

A variable rejection level system for a magnetostrictive transducer which improves the detectability of magnetostrictive pulses along a waveguide in the presence of background noise on the waveguide.

10 Claims, 8 Drawing Sheets

- TRANSDUCER INTERROGATION PULSE 28
- INHIBIT GATE 29
- OUTPUT FROM FF 31  32 — T1
- VOLTAGE ACROSS CAPACITOR 111

TIME →

FIG. 7

- TRANSDUCER INTERROGATION PULSE 28
- INHIBIT 29
- OUTPUT FROM FF 33  34 — T2
- OUTPUT FROM FF 31  32 — T1
- VOLTAGE ACROSS CAPACITOR 111

TIME →

VARIABLE REJECTION METHOD FOR IMPROVED SIGNAL DISCRIMINATION IN A MAGNETOSTRICTIVE POSITION TRANSDUCER

This is a continuation of application Ser. No. 07/756,978, filed Sep. 9, 1991, now abandoned.

BACKGROUND OF THE INVENTION

1. Field of the Invention

The present invention relates to magnetostrictive transducers or gauges. The magnetostrictive position transducer of the present invention includes an improved signal reception subsystem, which improves noise discrimination performance.

2. Description of the Prior Art

Magnetostrictive position sensor devices are widely used in the measurement and control industry. They find use in machine tools and robotics as well as other applications which call for accurate position indication.

The term magnetostriction usually refers to the dimensional change of a ferromagnetic body that occurs during magnetization. In general, magnetostrictive position sensors incorporate a ferromagnetic delay line, or "waveguide". A pulse generator supplies a current pulse to the delay line which generates a magnetic field which surrounds the delay line. A remote and movable, position indicating magnet, is placed at a position along the delay line. The magnetic field of the position indicating magnet interacts with and disturbs the magnetic field generated by the current pulse.

The interaction between the permanent magnetic field of the position indicating magnet and the magnetic field induced by the current pulse causes a strain or mechanical reaction within the delay line. This induced reaction force within the ferromagnetic delay line is propagated along the length of the delay line as an acoustic torsional wave, in accordance with the Wiedemann effect, which is known to those skilled in the art.

Since the speed of propagation in the delay line is fixed, one can determine the location of the acoustic wave source by measuring the time required to receive the delayed acoustic pulse. In operation, the time interval between the excitation pulse, initiated by the sampling clock, and the reception of the delayed acoustic pulse returned from the position indicating magnet, indicates the location of the position indicating magnet.

A transducer device, called a mode convertor, is typically attached to one end of the waveguide. The mode convertor responds to the passage of the torsional acoustic wave and converts the torsional acoustic wave into a representative electrical signal. Typically, the mode convertor device operates on the Villari or inverse magnetostrictive effect, where the application of strain alters the magnetic properties of the convertor.

The time delay period from the excitation of the waveguide to the delayed reception of the corresponding acoustic wave at the mode converter can be measured in a variety of ways. Also, the time delay can be converted into a position indicating signal in a variety of ways. Traditionally, position output information is available in a variety of formats.

For example, U.S. Pat. No. 3,898,555 to J. Tellerman uses a fixed frequency oscillator to excite the delay line. The returned acoustic signal, in conjunction with the fixed frequency oscillator, develops a "digital" signal which is "pulse width modulated" by the position of the magnet along the delay line. An integrator converts the pulse width modulated waveform to a DC voltage level which is delivered as the transducer's "analog" output signal.

U.S. Pat. No. 4,721,902 to J. Tellerman et al. teaches, inter alia, a method to convert the "pulse width modulated position signal" into a digital value. The patent teaches the use of a conversion counter to collect "counts" from a conversion oscillator during the "on" time of the pulse width modulated signal.

This patent also teaches a method to enhance the detection of the delayed acoustic signal through the use of a time domain filter which sets the duration of an inhibit timer based upon the historical output of the transducer. This time domain filtering technique eliminates the contribution of noise to the output signal; however, it effectively limits the maximum rate at which the position indicating magnet can move along the gauge.

Successful use of the magnetostrictive measurement technique requires the reliable detection of the delayed acoustic pulse. These acoustic pulses are attenuated during the course of transmission in the waveguide. In general, the amplitude of the acoustic pulses are the greatest when position indicating magnet is closest to the mode converter; the acoustic pulses are faintest when the magnet is remote from the mode converter. For example, signal attenuation approaches 60% as the stroke length reaches 60 feet. In this instance, noise originating near the mode converter end of the gauge can approach 30% of the signal. This factor makes the construction of long gauges problematical.

Noise sources affect the operation of the gauge as well. External or environmental factors which can alter the stability of the signal. For example, external electric and magnetic fields within the operating environment of the device may decrease the signal-to-noise ratio and make discrimination of the return signal more difficult. Internal noise sources such as magnetic abnormalities, discontinuities and foreign particles in the waveguide material contribute background noise to the waveguide.

These considerations show that the detectability of the signal is marginal on long gauges, where prior art detection circuits are used. As a consequence the maximum length of a magnetostrictive gauge was limited by the detectabilty, in the presence of noise, of the delayed acoustic pulse.

SUMMARY OF THE INVENTION

In contrast to prior art magnetostrictive measurement systems, the present invention includes a variable rejection circuit. The variable rejection circuit generates a rejection voltage which varies as a function of time. This time dependent voltage level is used as the reference value for signal detection. The variable reference voltage level compensates for the attenuation characteristics of the ferromagnetic delay line.

Since the noise on the waveguide attenuates in the same manner as the signal, the variable rejection level allows the receiving system to maintain a substantially constant ratio of the level of the rejection voltage to the level of the received signal. The relative constancy of the signal to noise ratio permits the creation of longer gauges or gauges having a noisier waveguide.

Three circuits and three operating modes are presented. Mode 1 and mode 2 are particularly useful in liquid level applications where the gauge length is relatively long, and the required position update rate is relatively low, since the liquid level varies relatively slowly. Mode 3 is particularly useful in machine control applications, where position data must be updated very quickly.

In each mode, the exponential decay of voltage in an RC circuit is used to compensate for the attenuation characteristics for the delay line or waveguide. In mode 1 the exponential decay begins approximately at the time the interrogation pulse is launched. In mode 2 the exponential decay is delayed and begins at the time that the converter amplifier comes out of saturation. This occurs within the active measurement stroke of the gauge. In mode 3 the capacitor of the RC timing circuit is actively and rapidly recharged during the "inhibit pulse" of the magnetostrictive position transducer, thus permitting incorporation of the variable level rejection system into a transducer which updates the position data very rapidly.

BRIEF DESCRIPTION OF THE DRAWINGS

In the drawings where like reference numerals refer to like components throughout several views.

DETAILED DESCRIPTION OF THE PREFERRED EMBODIMENTS

In the following detailed description of the preferred and illustrative embodiments, reference is made to the accompanying drawings which are shown by way of illustration. It is to be understood that other embodiments may be utilized and that structural or logical changes may be made without departing from the scope of the present invention.

GENERAL OPERATION OF MAGNETOSTRICTIVE TRANSDUCERS

Figure 11:
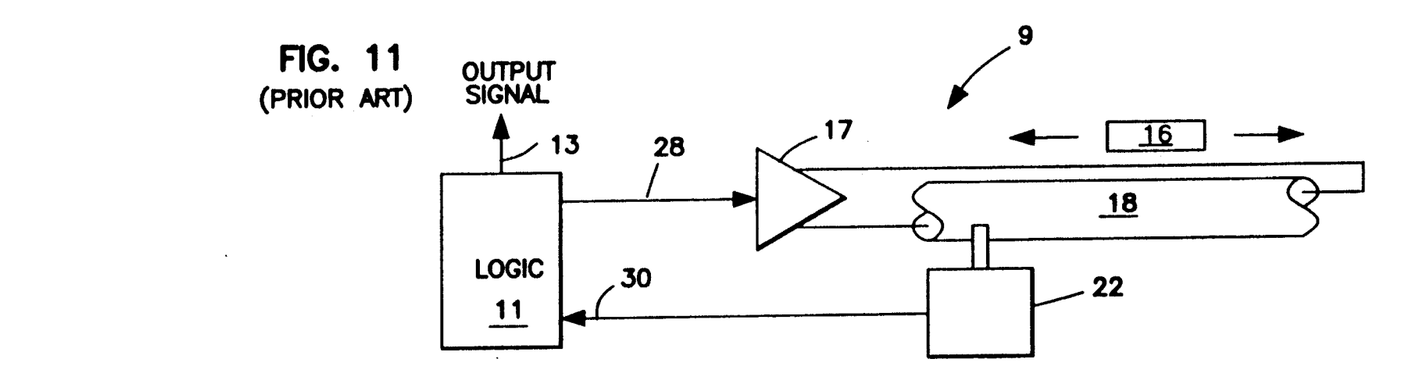
FIG. 11 is a block diagram depicting a conventional magnetostrictive transducer of the prior art; and, FIG. 12 is a timing diagram depicting the operation of the prior art circuitry of FIG. 11.

FIG. 11 shows a conventional magnetostrictive position measurement system. An understanding of the architecture of this prior art devices facilitates an understanding of the operation of the present invention.

In FIG. 11, the magnetostrictive transducer 9 includes a ferromagnetic delay line 18 which is excited by a pulse generator 17. The magnetic field generated around the delay line 18 interacts with the magnetic field of the position indicating magnet 16. This interaction generates a torsional acoustic pulse in the delay line 18 which is propagated along the length of the delay line. The mode converter 22 is physically coupled to the waveguide and detects the strain within the delay line as the acoustic pulse passes the location of the mode converter 22.

The logic circuitry 11 performs a number of control and measurement functions.

The logic 11 generates the interrogation signal on lead 28 which causes the current pulse generator 17 to generate a high current excitation pulse in the delay line.

The logic 11, also, measures the time interval between excitation of the or delay line and the reception of the returned acoustic pulse as indicated by an acoustic return signal on lead 30. The logic then converts the measured time interval into an appropriate output signal on lead 13.

The delay line 18 itself may be a solid ferromagnetic rod with a parallel return conductor as shown, or the delay line may be a ferromagnetic tube, having a parallel, or coaxial, return conductor. However, it should be understood that the mounting system used to support the waveguide can have a profound impact on the uniformity of the attenuation characteristics of the delay line. For this reason it is preferred to use a solid waveguide with no standoffs. Reference may be had to U.S. Pat. No. 4,939,457, which is incorporated by reference herein.

The mode converter 22 may also take many forms, however a common configuration involves a tape that is coupled to the periphery of the wave guide 18. The applied stress of the interrogation pulse produces a strain reaction in the waveguide 18. The strain reaction has both longitudinal and torsional (orthogonal) components. The tape has the ability to discriminate between the longitudinal and torsional components. The tape converts only the torsional component, which is less subject to interference and dispersion as compared to the longitudinal component, into an electrical signal for determining the position of the position indicating magnet 16.

Figure 12:
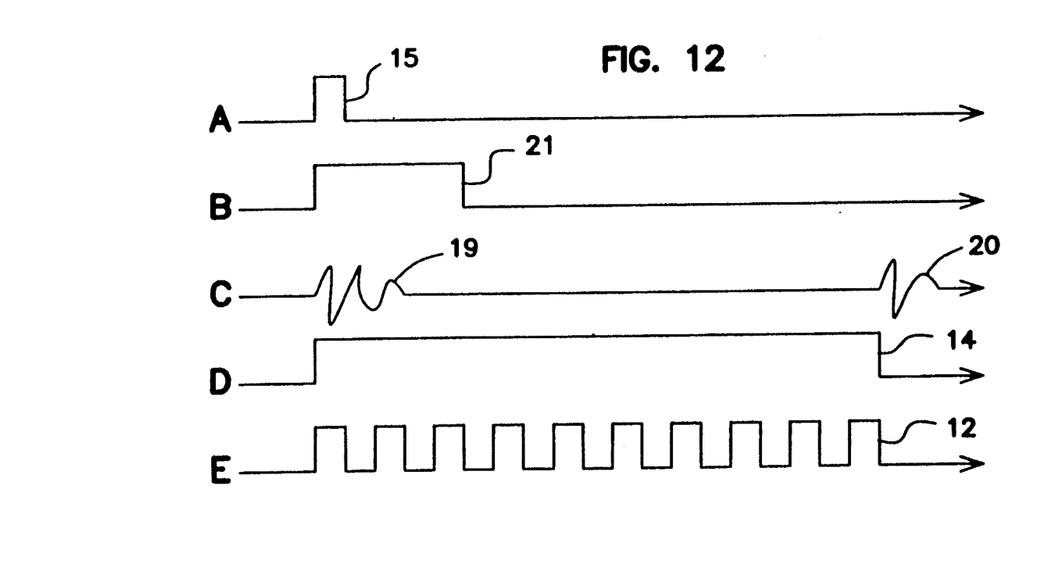

FIG. 12 depicts waveforms corresponding to a single time measurement cycle from the illustrative magnetostrictive system shown in FIG. 11. The cycle begins with an excitation pulse 15 from the pulse generator. This interrogation pulse is depicted in waveform trace A. The interrogation pulse disturbs the mode converter which generates a spurious output as shown by coincident waveform 19 on waveform trace C. This spurious mode convertor output is "inhibited" by a fixed duration inhibit pulse 21 as shown on waveform trace B.

The acoustic signal launched by the position indicating magnet 16, in response to the excitation pulse is eventually passes the location of the mode convertor 22 giving rise to the waveform 20 on waveform trace C. The logic 11 develops the time interval waveform shown as time interval 14 in waveform trace D. The reception of waveform 20 signal concludes one measurement cycle. This signal may be used directly or may used to gate a clock/counter which generates a collection of pulses shown as waveform 12 in waveform trace E. The waveform 12 represents the ANDing of clock pulses with the time interval 14. The number of pulses in waveform 12 of waveform trace E indicates the total amount of time required for the acoustic pulse to travel from the location of the position indicating magnet 16 to the location of the mode converter 22. The next measurement cycle may begin with the generation of a an interrogation signal originating with a sampling clock in the logic 11, or the next cycle maybe provoked by the "recirculation" of the mode convertor output. The recirculation technique improves position resolution by making a sequence of measurements.

OVERVIEW OF SYSTEM OPERATION

Figure 1:
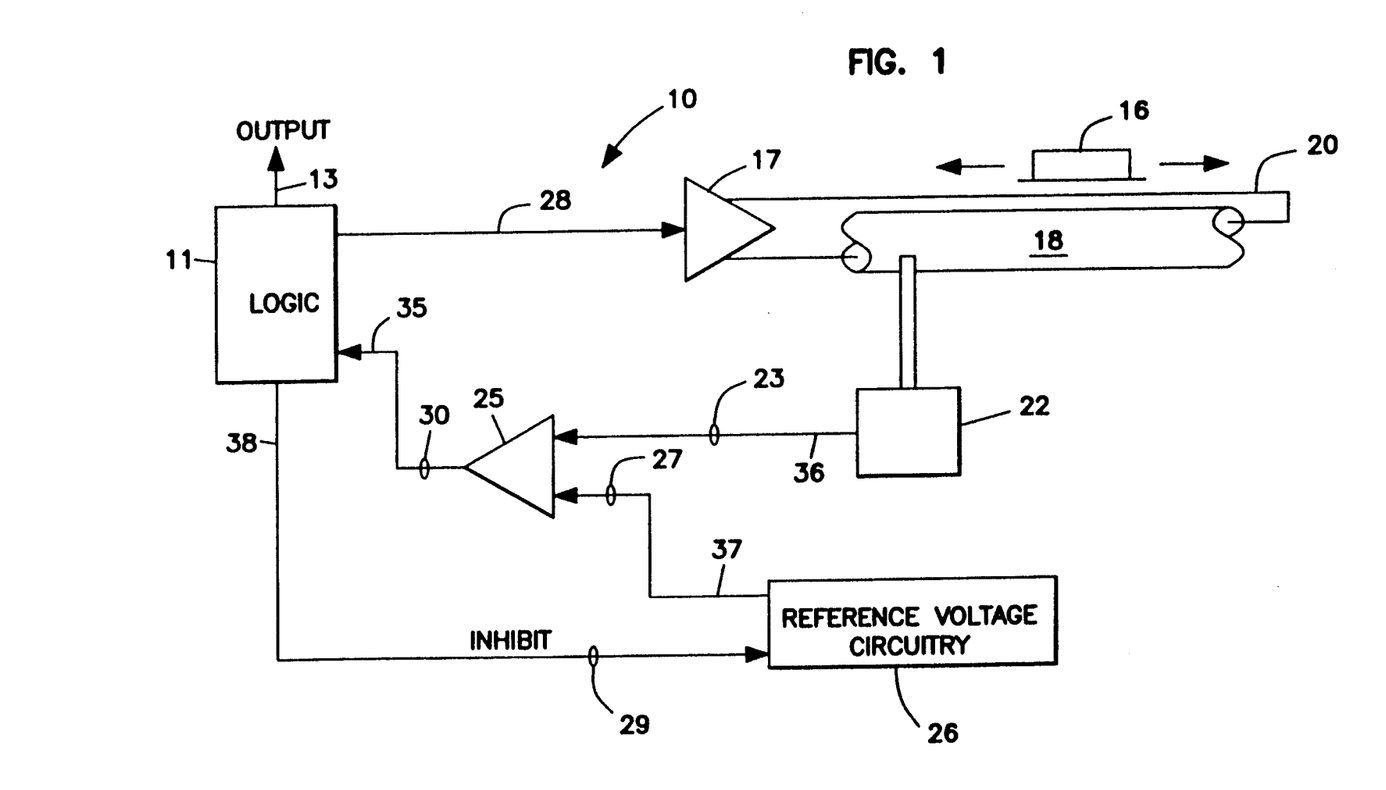
FIG. 1 is block diagram showing the variable rejection level elements incorporated into a magnetostrictive transducer system.

FIG. 1 shows a magnetostrictive transducer system which incorporates the invention. In this transducer system, the wideband analog output signal 36 of the mode convertor 22 present on lead 23 is compared with a reference level output signal 37 in a comparator 25. The reference voltage present on lead 27 is generated by the reference voltage circuit 26. The comparator 25 generates an output signal 35 on lead 30 indicative of the passage of an acoustic pulse if the amplitude of the acoustic signal from the mode convertor output signal 36 on lead 23 exceeds the instantaneous values of the reference voltage present on lead 27.

The reference level circuitry 26 is activated by the "inhibit" signal 38 present on lead 29 generated by logic 11. In response to the inhibit signal present on lead 29, level the reference circuit 26 generates a time varying voltage signal on lead 27. The decay of the reference level output signal 36 as a function of time matches the attenuation characteristic of the delay line 18 to the gain characteristics of the mode convertor 22. In general, the longer the acoustic delay time, the smaller the amplitude of the returned mode convertor output signal 36 signal required to meet the detection criteria of the comparator 25.

The three modes of operation differ in the manner in which that the reference voltage level is produced and applied to the comparator.

ATTENUATION CHARACTERISTICS

The amplitude or level of the signal returned by the waveguide or delay line in response to the interrogation pulse depends upon the position of the location indicating magnet. The waveguide has a predictable attenuation characteristic which facilitates the generation of a variable rejection voltage to track the return signal.

Figure 2:
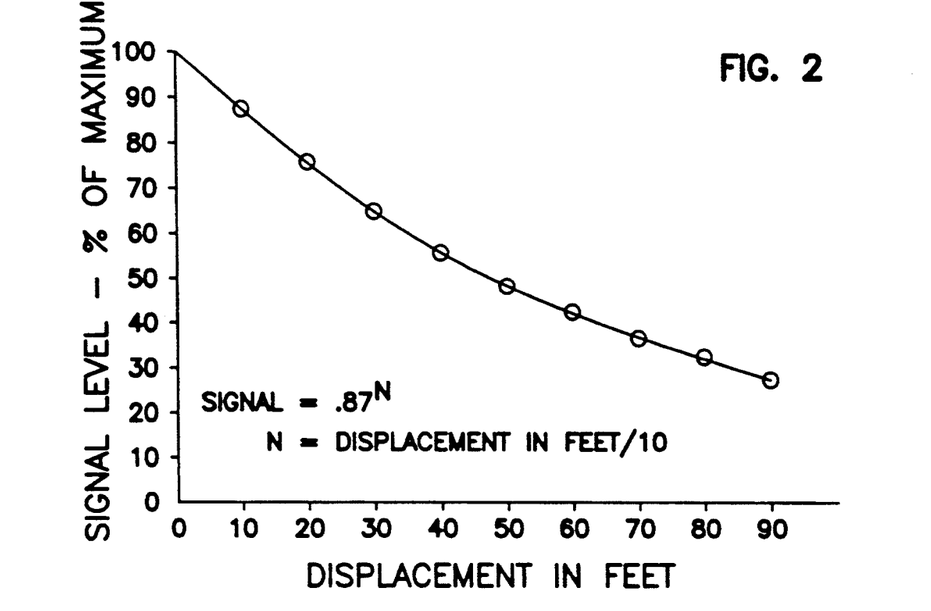
FIG. 2 is a graph depicting the measured attenuation characteristic of a specific ferromagnetic delay line.

FIG. 2 shows the attenuation characteristic of the ferromagnetic delay line as a function of time. As the position of the location indicating magnet becomes increasingly distant with respect to the detector, the amplitude of the returned acoustic torsional pulse decreases, causing an attenuation of the received electrical signal in response to the acoustic torsional pulse. The graph of FIG. 2 may be shown empirically by the equation:

$$A = A_{max} \times (0.87)^N \quad (1)$$

In equation [1], A is the returned signal amplitude, $A_{max}$ is the maximum signal amplitude, and N is the position of the location indicating magnet measured from the transducer head in feet and divided by ten.

The predictability of the attenuation characteristic shown graphically in FIG. 2, and empirically in equation [1], may be advantageously applied to the generation of a rejection signal in order to increase the detectability and discrimination of the return signal from noise. The noise level generally attenuates in the same relation as the return signal. Therefore, a rejection voltage which tracks the return signal will allow for the rejection of a constant percentage of noise in the return signal independent of the location indicating magnet position. If, for example, the rejection signal amplitude is 50% of the return signal amplitude, and the rejection signal has an attenuation characteristic similar to that of FIG. 2, then 50% of the noise may be rejected at any point along the ferromagnetic delay line.

The present invention achieves and advantageously applies a variable rejection level signal. The tracking of the attenuation of the return signal is achieved by generating a rejection voltage which varies as a function of time. The time-varying rejection voltage should fit the attenuation characteristic of the delay line so that the ratio of the rejection voltage to the return signal remains fairly constant. In this manner, as stated above, a constant percentage of noise may be rejected at any point along the delay line, which increases the detectability and discrimination of the return signal for long delay lines.

REFERENCE VOLTAGE GENERATION CIRCUITS

Figure 3:
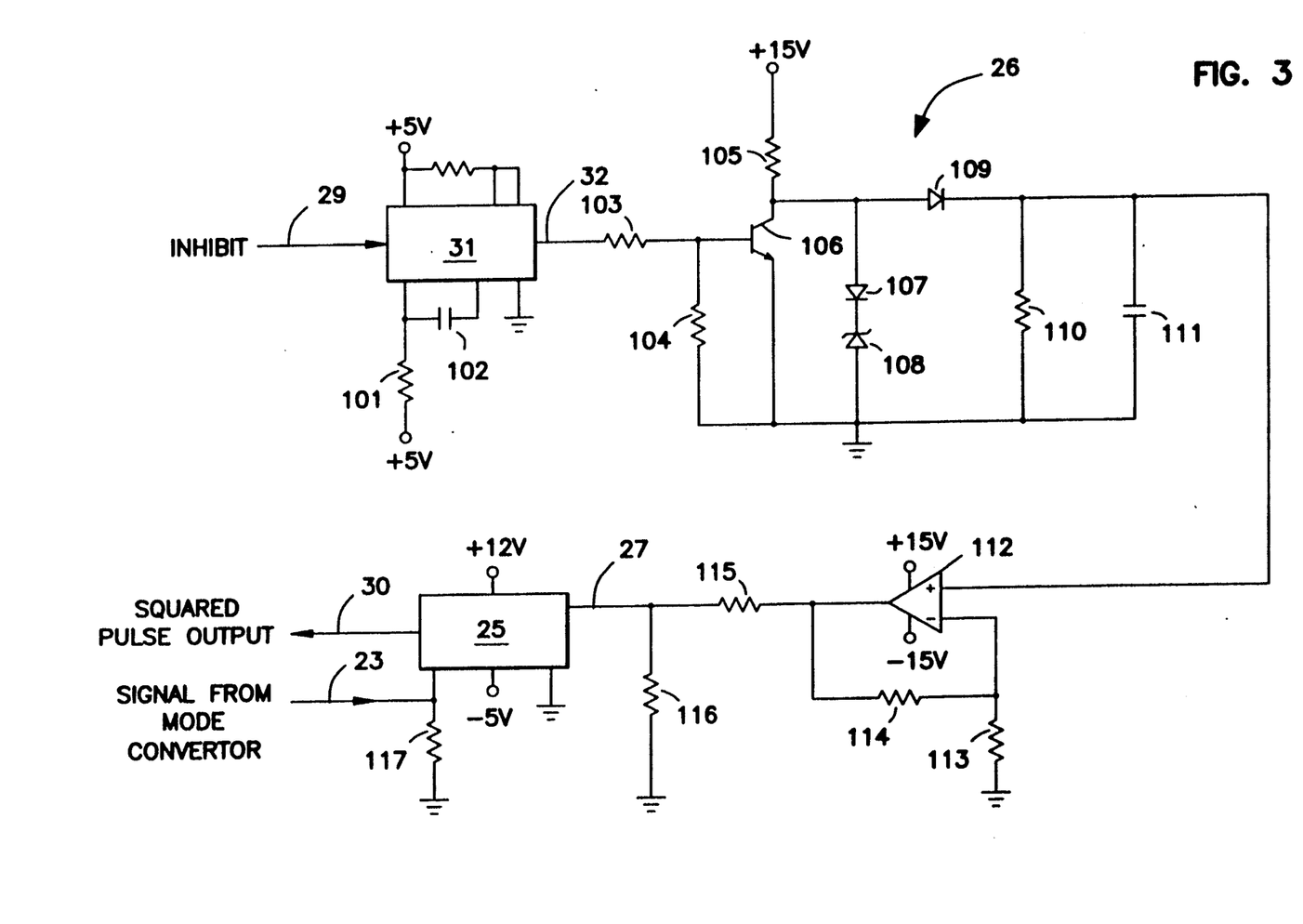
FIG. 3 is a schematic diagram of the mode 1 rejection signal generation circuit.

FIG. 3 is a schematic diagram which shows the comparator 25 and the reference voltage circuitry 26. These elements connect to the mode convertor 22, and its associated level conditioning circuits (FIG. 1), and the timing and control logic 11 (FIG. 1).

The reference voltage circuits of FIG. 3 may be used to implement mode 1 operation. This circuitry 26 is useful for those applications where the mode convertor gain factor is adjusted to stay just below the clipping level at the beginning of the position indicating magnet stroke. The circuit also assumes that the time between interrogations is relatively long.

The "inhibit" signal from the control logic 11 received on lead 29 triggers monostable flip-flop timer 31 (74121). The time duration of the monostable output 32 is determined by the time constant of resistor 101 and capacitor 102. This time duration of this pulse (T1) should be equal to the active time region of displacement for the gauge plus a predetermined amount of tolerance, such as 5–10%.

The delay between interrogation pulses is of a sufficient duration to allow for signal processing. During this long delay, the output 32 of flip flop 31 is switched to a low state for the purpose of turning off transistor 106 (2N2222). Since transistor 106 will draw negligible current, when off, current from the 15 volt power supply will charge capacitor 111 through resistor 105 and diode 109. Capacitor 111 will charge to the level of the 6.2 volt drop across Zener diode 108. Diode 107 compensates for the voltage drop across diode 109.

Capacitor 111 can be a polycarbonate or polystyrene capacitor depending upon the temperature tolerance needed. Polystyrene has a better temperature coefficient of −130 ppm/oc but a limited temperature range of 85° C. compared to the polycarbonate capacitor change of approximately 2% over a temperature range of 125° C.

The voltage across capacitor 111 is applied to the op-amp 112, which acts as a high impedance buffer. The amplifier load on capacitor 111 is in the order of 1 megohm or more for FET-input op-amps. Op-amp 112 transmits the rejection signal to the comparator 25 (type 710). Resistors 115 and 116 can be used to attenuate the level of the rejection signal. Also, resistor 114 and resistor 113 can be used to change the rejection level by adjusting the gain of op-amp 112. Therefore, the initial 6.2 volts differential across capacitor 111 can be adjusted by resistors 114–116 to provide the desired rejection level to comparator 25. Comparator 25 is a high speed differential comparator which, by a comparison, determines the amount of the signal on lead 23 from the mode convertor 22 which is above the rejection signal level and amplifies and squares this signal, which is transmitted to the logic 11 via lead 30.

When the state of the output 32 of the monostable flip-flop 31 changes, the voltage on the output 32 rises, turning on transistor 106 by providing a sufficient voltage drop across resistor 104 and resistor 103. As transistor 106 draws current, diode 109 becomes reverse-biased, and capacitor 111 discharges through resistor 110. This results in an exponential decay of voltage on capacitor 111, which is buffered and transmitted to the comparator 25 by the op-amp 112.

Figure 4:
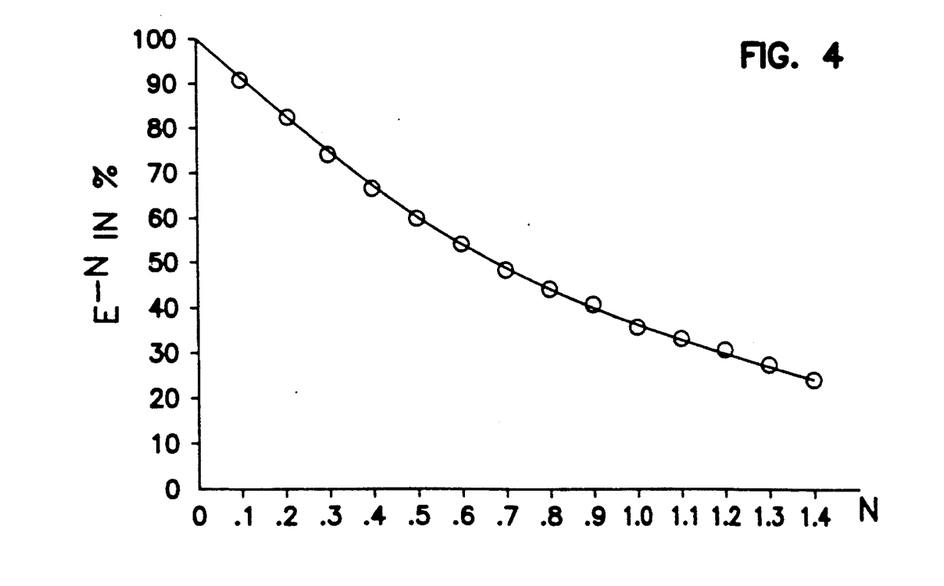
FIG. 4 is a graph of the rejection signal level as a function of time.

The rate of exponential decay of voltage on capacitor 111, as would be known to one skilled in the art, depends upon the time constant of resistor 110 and capacitor 111. FIG. 4 shows the voltage decay on capacitor 111 in percent as a function of time. A comparison of FIGS. 2 and 4 shows the amplitude decay on capacitor 111 is almost identical to the attenuation characteristic of the delay line. Therefore, the amplitude decay of the reference voltage level as a function of time provides for a good match with the attenuation of the returned acoustic signal as a function of transit time.

Figure 5:
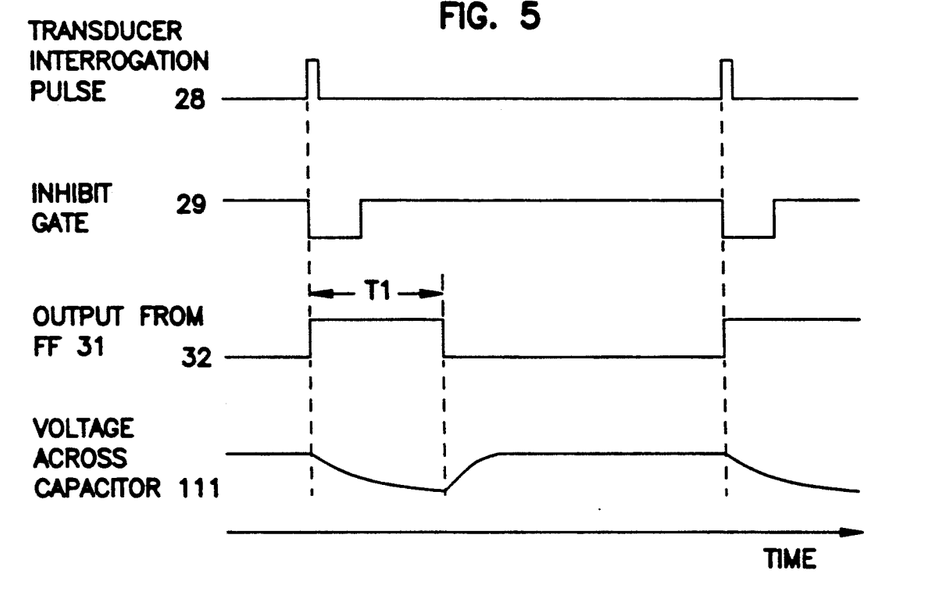
FIG. 5 is a timing diagram showing the relationship of the interrogation pulse to signals generated in the rejection signal generation circuit shown schematically in FIG. 3.

FIG. 5 shows the relationship of the signals in the rejection signal generation circuit. When the interrogation pulse is applied to the delay line 18, the INHIBIT signal or lead 29 triggers the monostable, and capacitor 111 discharges. The voltage on capacitor 111 decays during the time interval T1 as established by the monostable. After T1, when the transducer is not active, capacitor 111 charges and sustains a high voltage level desirable for rejecting possible pick-up noise externally induced.

The following provides an example of determining the R-C time constant (resistor 110 × capacitor 111) of the rejection voltage generation circuit in order to fit the attenuation characteristics of the delay line. First, consider that the voltage on capacitor 111 discharging through resistor 110 drops to 0.368 of the initial value in one time constant (R×C). This value is obtained through equations defining the voltage on a capacitor in an R-C configuration and are well known to those skilled in the art. Next, using equation [1], one may determine the point on the delay line where the return signal drops to 0.368 of the maximum value (0.368×$A_{max}$), which is 71.8 feet or 861.6 inches. This displacement may be related to a time delay in the transducer by a transducer gradient of nominally 9.05 microseconds per inch. The time delay is, therefore, 9.05 microseconds per inch × 861.6 inches = 7797.5 microseconds of the signal reduction to 0.368 after the transducer pulse excitation. Thus, the rejection voltage decay circuit should have a time constant of 7797.5 microseconds for ideal tracking.

The values of resistor 110 and capacitor 111 may be determined using the time constant. Also, as previously mentioned, the initial value of the rejection voltage may be adjusted by the op-amp 112 or resistors 115 and 116.

One skilled in the art will recognize that this example is used for an illustrative purpose and different component values may be used or the rejection voltage may be fitted to a different attenuation characteristic without departing from the scope of the invention.

The present invention may also be shown in alternate embodiments which accommodate different transducer types by adjusting the rejection signal profile. For example, it may be desirable to adjust the signal gain amplifier to provide a higher signal level for the whole stroke, which manifests itself as signal saturation at the beginning of the stroke. The signal saturation lasts for a predetermined time interval, which has a duration on the order of milliseconds, at the beginning of the stroke time period. This condition requires that the rejection voltage remains at its maximum voltage for the predetermined time interval after the inhibit gate and before the circuit generates exponential decay.

Figure 6:
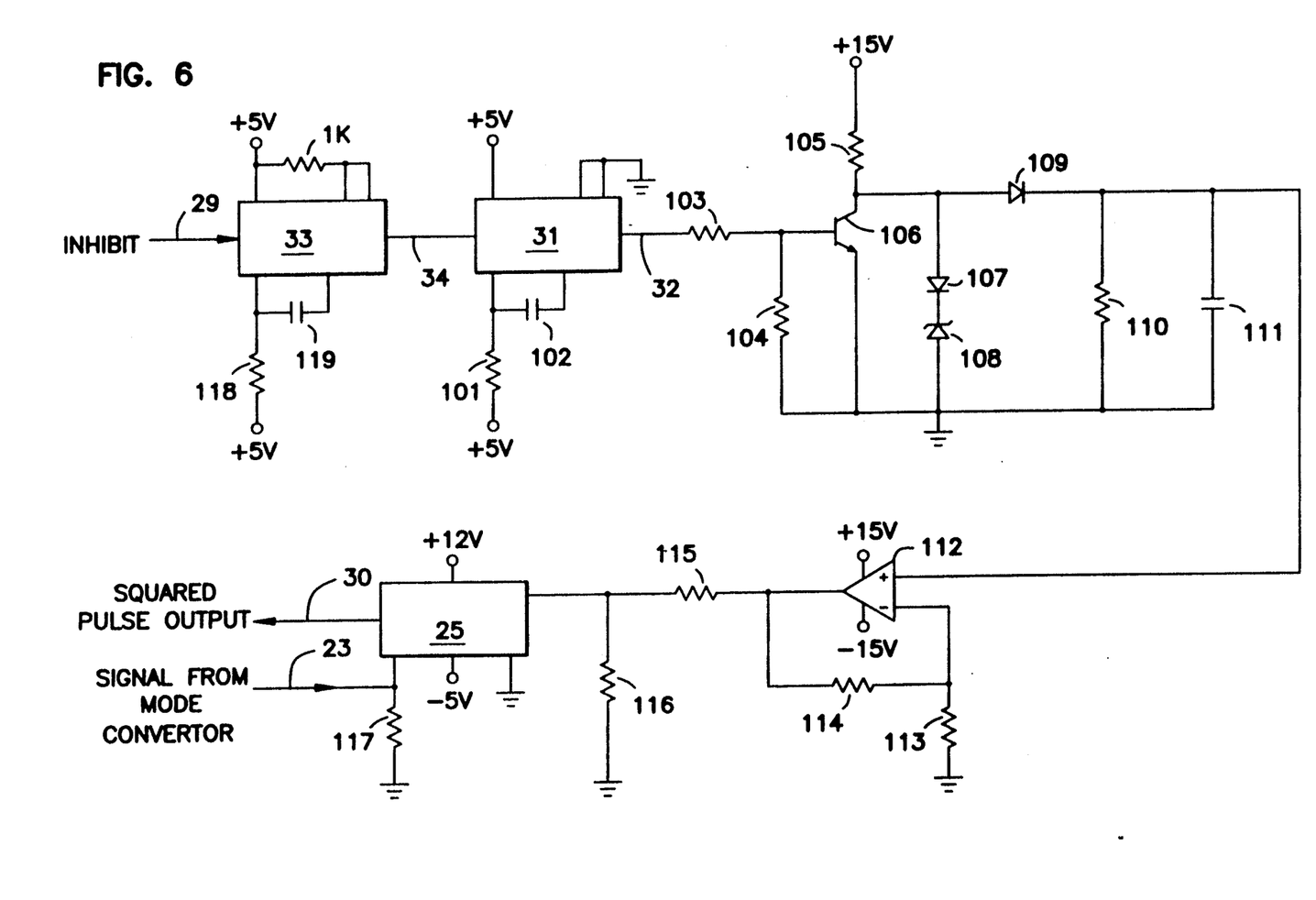
FIG. 6 is a schematic diagram of the mode 2 rejection signal generation circuit.

FIG. 6 shows how the circuit of FIG. 3 can be modified to operate in mode 2. In this embodiment the exponential decay of voltage is delayed for a predetermined fraction of a second. The principal modification is the addition of another monostable flip-flop 33 which receives the "inhibit" signal and delays the triggering of flip flop 31.

Figure 7:
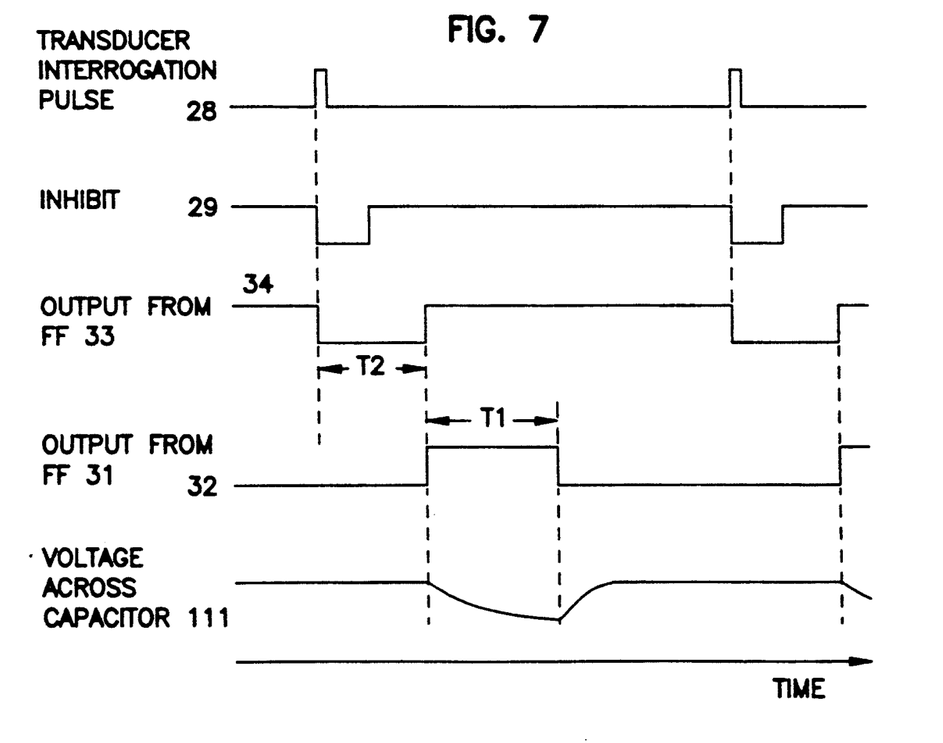
FIG. 7 is a timing diagram showing the relationship of the interrogation pulse to signals generated in the mode 2 rejection signal generation circuit shown in FIG. 6.

FIG. 7 shows the relationship of the signals generated in the modified circuit of FIG. 6. When the interrogation pulse is generated, the "inhibit" signal triggers flip flop 33. After a predetermined time, T2, flip flop 33 triggers flip flop 31 by the lagging edge of the output 34 from flip flop 33. The triggering of flip flop 31 starts the process previously described, whereby capacitor 111 discharges through resistor 110. The predetermined time T2 is established by the time constant of resistor 118 and capacitor 119 shown in FIG. 6.

In both mode 1 and mode 2 the recharge of capacitor 111 occurs during the interpulse interval. With low interrogation rates there is sufficient time to achieve an essentially complete recharge of capacitor 111.

However another mode of transducer operation is required where the transducer interrogation period is kept short in order to provide faster response time. Also, it may be assumed that this mode of operation requires a saturated signal for a predetermined time before voltage decay, as with the previous example.

Figure 8:
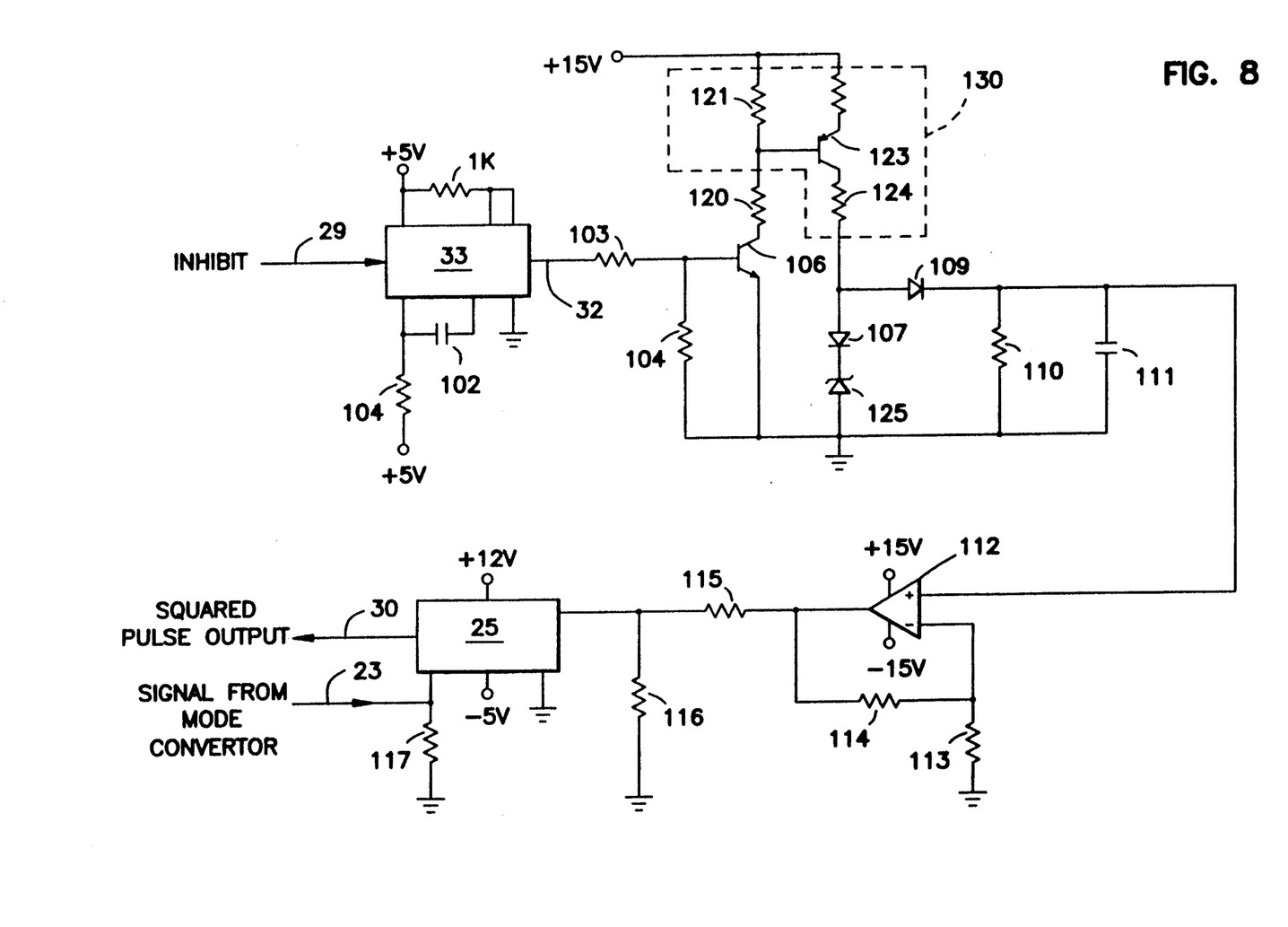
FIG. 8 is a schematic diagram of a mode 3 rejection signal generation circuit.
Figure 9:
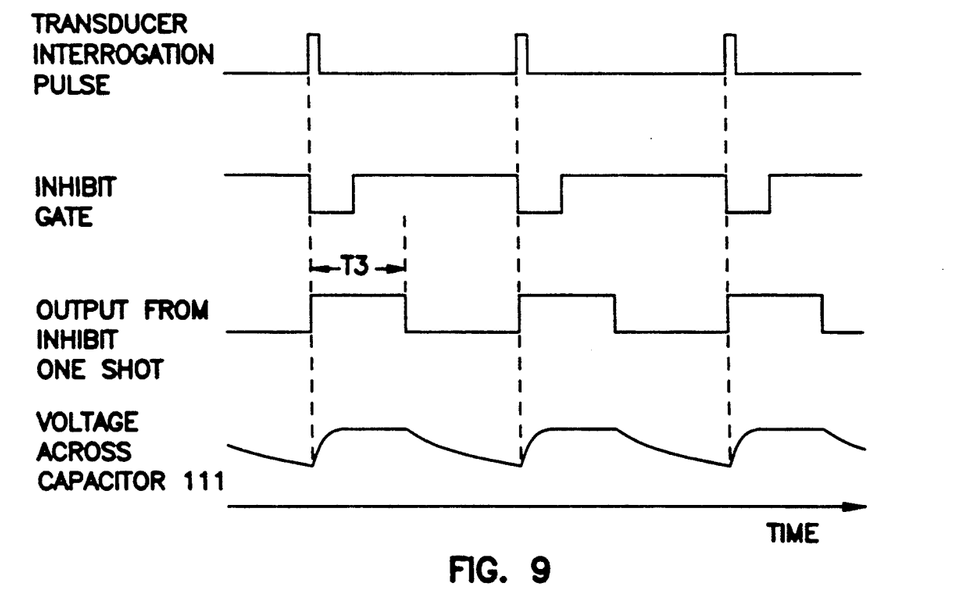
FIG. 9 is a timing diagram showing the relationship of the interrogation pulse to signals generated in the mode 3 rejection signal generation circuit.

In mode 3, capacitor 111 must be charged very fast during the period of the "inhibit" signal and then maintained at a maximum voltage level for a predetermined time. FIG. 8 shows the additional fast charge circuitry 130 which is used to accomplish the fast charging of capacitor 111. FIG. 9 shows the relationship of the signals in the circuit of FIG. 8.

The "inhibit" signal triggers flip flop 33 which causes the flip flop to maintain a high voltage on output 32 for a predetermined time T3. During T3, the high voltage on output 32 turns on transistor 106, which turns on transistor 123. The addition of transistor 123 provides sufficient current sourcing capability to quickly charge capacitor 111 through diode 109. A 3.1 volt Zener diode 125 is used to clamp the voltage on capacitor 111. The voltage on capacitor 111 approaches the 3.1 Zener diode voltage within 10 microseconds, which is well within the 22 microsecond inhibit time introduced in the typical system logic during which time no transients from the pulse generator 17 induced on the delay line can affect the detector system. The sustained 3.1 volts on capacitor 111 rejects unwanted signals during the inhibit time.

After the predetermined period T3, the voltage on lead 32 drops, turning off transistors 106 and 123. Capacitor 111 then discharges through resistor 110, providing the exponential decay for a rejection voltage. As with the previous circuits, the rejection signal is buffered by op-amp 112 and transmitted to the comparator 25.

In yet another mode of operation, closely related to mode 3, a short interrogation pulse period is present, as with the previous example, but the rejection signal is not allowed to saturate or clip. This may be achieved using the circuit of FIG. 8 by removing flip flop 33 and applying an inverted "inhibit" signal directly to the base of transistor 106 through resistor 103.

Figure 10:
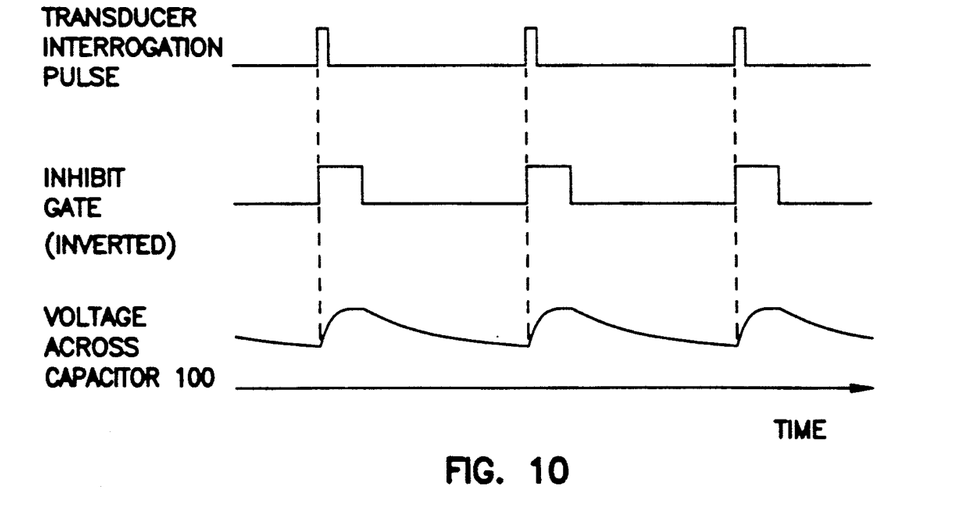
FIG. 10 is a timing diagram showing the relationship of the interrogation pulse to signals generated in a modified mode 3 rejection signal generation circuit.

FIG. 10 shows a timing diagram for the signals of this mode. In this case, the "inhibit" signal turns on transistors 106 and 123, which rapidly charge capacitor 111. When the "inhibit" signal drops, transistors 106 and 123 turn off, and capacitor 111 discharges, producing the exponential voltage decay.

The above network implementations are based on analog circuits because they provide the needed characteristics inherently and very simply. If a microprocessor or computer is used in connection with the present invention, it may be possible to digitally program the inhibit gate profile as described above. This, of course, will serve the same purpose of extending the useful operation of the transducers to longer displacement ranges and provide reasonably good operation margins for these applications.

While the present invention has been described in connection with the preferred embodiment thereof, it will be understood that many modifications will be readily apparent to those skilled in the art, and this application is intended to cover any adaptations or variations thereof. For example, different component values may be used in order to fit a rejection voltage to different attenuation characteristics without departing from the scope of the invention.

I claim:

1. A magnetostrictive transducer, comprising:
   a ferromagnetic delay line;
   a pulse generator coupled to said ferromagnetic delay line for generating a current excitation pulse in said ferromagnetic delay line;
   magnet means located proximate said ferromagnetic delay line for converting said current excitation pulse propagating in said ferromagnetic delay line into an acoustic pulse propagating in said ferromagnetic delay line;
   mode convertor means coupled to said ferromagnetic delay line for detecting said acoustic pulse and converting said acoustic pulse into a corresponding representative mode convertor signal;
   comparator means coupled to said mode convertor means for comparing said mode convertor signal to a rejection signal reference level thereby generating a comparator output signal;
   circuit means, coupled to said comparator means and to said pulse generator, for generating an interrogation pulse which causes the pulse generator to generate said current excitation pulse, and for measuring a time interval between generation of said interrogation pulse and reception of said acoustic pulse by said mode convertor as indicated by the occurrence of said comparator output signal, said circuit means including position determination means for determining, responsive to a value of said ferromagnetic delay line;
   rejection signal generation means coupled to said circuit means and said comparator means for generating said rejection signal initiated by said interrogation pulse; said reference level of said rejection signal, having a DC amplitude varying in direct proportion to the level of said mode convertor signal so that for any magnet means location along said ferromagnetic delay line, the ratio of said rejection signal level to said mode convertor signal level is substantially constant; and
   wherein said rejection signal generation means further includes buffer means, coupled to said circuit means and said comparator means, for adjusting said reference level of the rejection signal, the buffer means electrically connecting to a capacitor which provides a charging/discharging signal responsive to the interrogation pulse.

2. The magnetostrictive transducer of claim 1, wherein said buffer means adjusts said reference level of the rejection signal without any externally generated ramp voltage.

3. The magnetostrictive transducer of claim 1, wherein said capacitor is charged to a maximum value, an initiation of said charging occurring contiguous in time with an application of said interrogation pulse to said delay line.

4. The magnetostrictive transducer of claim 1, wherein the rejection signal generation means further includes a voltage source electrically connecting to the capacitor.

5. The magnetostrictive transducer of claim 4, wherein the voltage source comprises a transistor.

6. A magnetostrictive transducer, comprising:
   a ferromagnetic delay line (18) forming a gauge;
   a pulse generator (17), electrically couple to said delay line (18) for generating a plurality of DC electrical excitation pulses (15) in said delay line (18);
   a position indicating magnet (16) proximate said delay line (18) for converting a first one of aid DC electrical excitation pulses (15) into an acoustic pulse (20) propagating in said ferromagnetic delay line, from the location of said position indicating magnet (16) on said gauge;
   a mode convertor (22) proximate said ferromagnetic delay line (18) for converting said acoustic pulse (20) into a mode convertor output signal (36);
   logic (11) for generating an inhibit signal (38), said inhibit signal (38) substantially coincident with said first one of said excitation pulses (15), said logic (11) for generating an output (13) indication of the location of said position indicating magnet (16) along said gauge based upon the time interval between (16) along said gauge based upon the time interval between said first one of said excitation pulses (15) and a comparator output signal (35);
   a comparator (25) coupled to said mode convertor (22) for generating said comparator output signal (35) when said mode convertor output signal (36) exceeds a DC reference level output signal (37);
   reference level means (26) responsive to said inhibit signal (38) for generating said reference level output signal (37), said reference level output signal (37) having a time varying value which varies from an initial value to a terminal value, to compensate for acoustic pulse (20) attenuation in said delay line (18), said reference level means (26) including buffer means (112, 113, 114, 115, 116), coupled to said logic (11) and said comparator (25), for adjusting said reference level output signal (37), the buffer means electrically connecting to a capacitor (111) which provides a charging/discharging signal responsive to said inhibit signal (38).

7. The magnetostrictive transducer of claim 6, wherein said buffer means (112, 113, 114, 115, 116) adjusts said reference level output signal (37) without any externally generated ramp voltage.

8. The magnetostrictive transducer of claim 6 wherein said reference level means includes:
   a first timer defining a first time interval, said first time interval extending from said first one of said excitation pulses for a fixed duration, and wherein said reference level output signal has said initial value proximate the beginning of said first time interval and has said terminal value at the conclusion of said first time interval, and wherein said first time interval defines the measurement period for determining the location of said position indicating magnet along said gauge.

9. The magnetostrictive transducer of claim 6 wherein said reference level means includes:
   a first time defining a first time interval, said first time interval extending from said first one of said excitation pulses for a fixed duration, and wherein said reference level output signal has said initial value throughout said first time interval;
   a second timer initiated by the conclusion of said first time interval and defining a second time interval, said reference level output signal has said initial value at the start of said second time interval and has said terminal value at the conclusion of said second time interval, and wherein said first time interval together with said second time interval together defines the measurement period for determining the location of said position indicating magnet along said gauge.

10. The magnetostrictive transducer of claim 6 wherein said reference level means includes;
   a first timer defining a first time interval, said first time interval starting coincident with the generation of a first one of plurality of said excitation pulses, wherein said reference level output signal has said initial value during said first time interval and has said terminal value at the occurrence of the next one of said plurality of excitation pulses.

* * * * *

UNITED STATES PATENT AND TRADEMARK OFFICE
CERTIFICATE OF CORRECTION

PATENT NO. : 5,334,933

DATED : August 2, 1994

INVENTOR(S) : Jacob Tellerman

It is certified that error appears in the above-identified patent and that said Letters Patent is hereby corrected as shown below:

In column 1, line 47, please delete the word magnet
In column 4, line 21, before the words "or delay line", please insert the word --waveguide--
In column 4, line 61, please delete the words "pulse is", and insert therefor --pulse 15--
In column 4, line 67, after the words "directly or may", please insert the word --be--
In column 5, line 8, after the words "generation of", please delete the letter "a"
In column 5, line 30, please delete the words "level the reference", and insert therefor --the reference level--
In column 5, line 36, after the words "output signal 36", please insert --, the--
In column 7, line 37, please delete the word "or", and insert therefor --on--
In column 10, line 1, after the word "of", please insert --said time interval, a position of said magnet means on--
In column 10, line 37, after the word "electrically", please delete the word "couple", and insert therefor --coupled--
In column 10, lines 56 and 57, after the word "between", please delete the words "(16) along said gauge based upon the time interval between"

Signed and Sealed this

Eleventh Day of April, 1995

Attest:

BRUCE LEHMAN

Attesting Officer

Commissioner of Patents and Trademarks